April 2, 1957   J. A. HUNT   2,787,020
FOWL CLEANING TOOL
Filed April 11, 1955
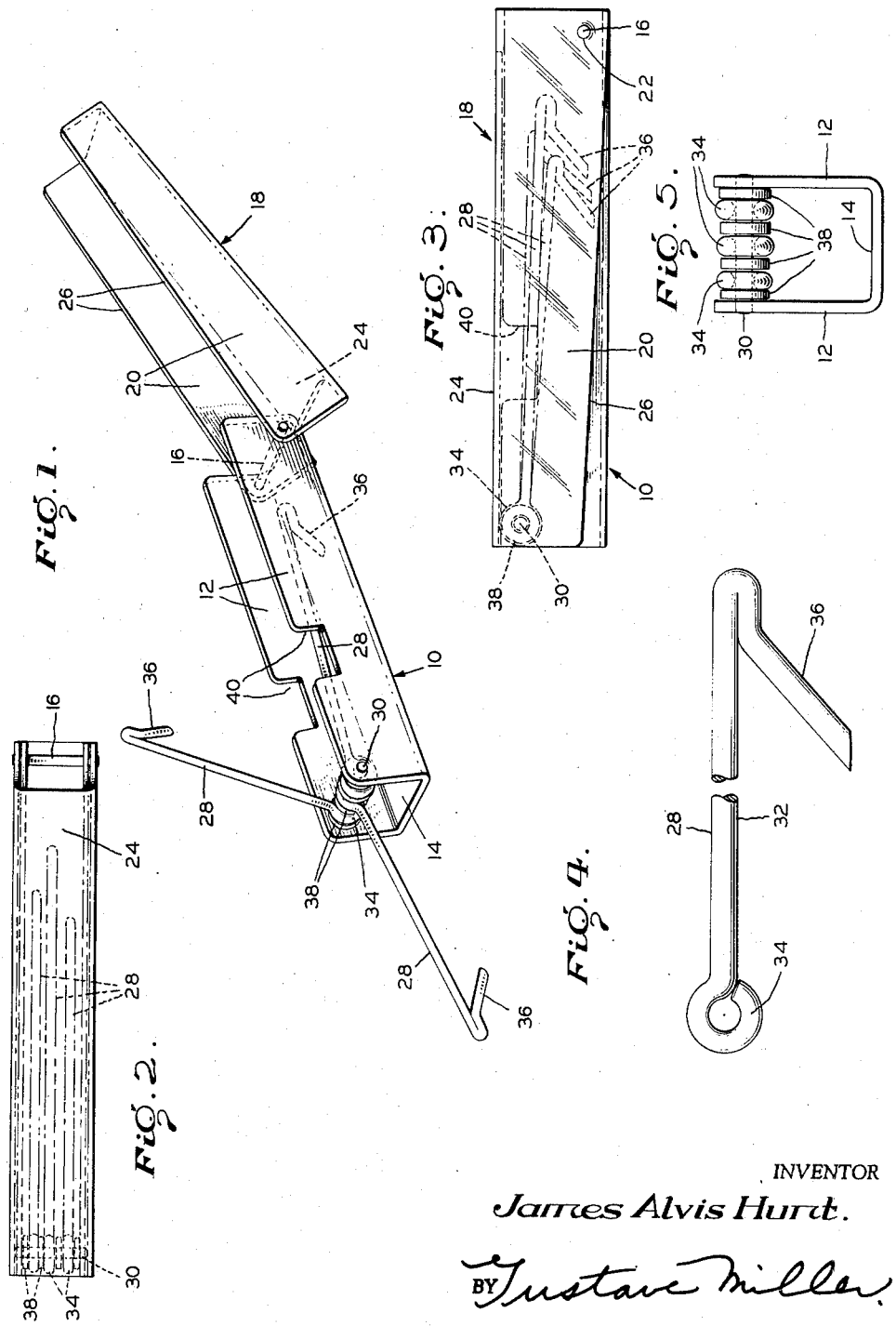
INVENTOR
James Alvis Hunt.
BY Gustave Miller
ATTORNEY

United States Patent Office 2,787,020
Patented Apr. 2, 1957

2,787,020

FOWL CLEANING TOOL

James Alvis Hunt, Memphis, Tenn., assignor to
Gustave Miller, Washington, D. C.

Application April 11, 1955, Serial No. 500,460

9 Claims. (Cl. 17—11)

This invention relates to a cleaning tool for fowl and the like, and it particularly relates to a cleaning tool which is adapted to remove the intestines of the fowl quickly and easily.

The present tool is especially adapted to be used by hunters in the field for the purpose of preventing rapid spoilage of game. If the hunter does not quickly remove the intestines, the taste of the fowl will become deleteriously affected and the game will rapidly spoil. This is due to the fact that the digested food in the intestines quickly decays and this decay spreads rapidly. On the other hand, the undigested food in the gizzard or stomach spoils very much more slowly and these parts may, therefore, be left in the body until they can be removed at leisure.

If a knife is used to remove the intestines, unless the hunter is possessed of great skill, the body of the bird will be marred and disfigured and a great deal of blood will be spilled. As a result, not only is the game no longer fit to be photographed or in a condition to be easily stuffed, but the hunter is covered with blood and mess so that he finds himself in a highly unsavory condition.

The tool embodied in the present invention makes the use of a knife unnecessary. By using this tool, the intestine is removed quickly and easily without any disfigurement of the game. In fact, the bird is left in substantially its life-like state with its skin and plummage intact. Furthermore, there is very little spilling of blood in the process.

It is, therefore, one object of the present invention to provide an intestine remover for game which is adapted to quickly and easily remove the intestine in a clean and efficient manner.

Another object of the present invention is to provide an intestine remover for game which permits the eviscerated game to remain in a life-like, undamaged condition.

Another object of the present invention is to provide an intestine remover for game which permits the intestine to be removed with a minimum amount of bloodletting.

Other objects of the present invention are to provide an improved device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

Fig. 1 is a perspective view of a device embodying the present invention, with the device being shown in open position.

Fig. 2 is a top plan view of the device of Fig. 1, shown in closed position.

Fig. 3 is a side elevational view of the device in closed position.

Fig. 4 is an enlarged, fragmentary, side elevational view of one of the hooks used in the device.

Fig. 5 is an enlarged, fragmentary front view of the device, showing the hook pivots and spacer arrangement.

Referring now in greater detail to the drawings wherein similar reference characters refer to similar parts, there is shown a housing 10, comprising a pair of parallel side walls 12 connected by an integral bottom wall 14. The top of the housing is open, as best seen in Fig. 1, as are also the ends. A pivot pin 16 extends between the side walls 12 at one end of the housing 10, with the ends of the pivot pin extending through and beyond the respective side walls.

A cover 18 is pivotally connected to the housing 10 by means of the pivot pin 16; the two side walls 20 of the cover each overlapping the outer surface of the corresponding housing side walls 12, and being connected to the ends of the pivot pin 16 by means of corresponding openings 22 in the cover side walls. The cover side walls 20 are connected to each other by a top wall 24 spaced slightly inwardly, at its front end, adjacent the pivot position, from the ends of the side walls, as best seen in Fig. 2. This permits the pivoting action to take place unobstructed.

Each of the cover side walls 20 are inclined upwardly from the pivoted end, at one edge, these inclined edges being indicated at 26. These inclined edges 26 form a finger grip when the cover 18 is closed on the housing 10, as shown in Fig. 3, so that, in order to open the device, it is merely necessary to insert the fingers under either one or both inclined edges 26 and push upwardly.

The housing 10 holds the operating portion of the device, this operating portion taking the form of a plurality of hooks 28 individually mounted for pivotal movement on a pivot pin 30 which extends between the side walls 12 at that end of the housing 10 which is opposite the end to which the cover is pivoted.

Each hook 28 comprises an arm 32 having an eyelet 34 at one end, and a barb 36 at the opposite end. The eyelets 34 are pivotally mounted on the pin 30, and are laterally spaced from each other on the pivot pin by means of spacing washers 38. Each hook can be used separately or together, as necessary. Although three such hooks 28 of different lengths are illustrated, only one may be provided, or the number may vary as desired.

A slot 40 is provided at corresponding portions of the top edge of each side wall 12. These slots 40 provide finger entrant means for grasping the hooks when they are in their inoperative, folded position within the housing, so that they may be pivoted out from the inoperative position, shown in dotted outline in Fig. 3, into the operative position shown in full line in Fig. 1.

The hooks 28 are preferably made of stainless steel while the housing and its cover are preferably made of aluminum, chrome-plated metal, or any other suitable non-rusting or non-corrosive material.

In operation, the intestines are removed from the body of the bird by inserting the hook into the "vent" or rectum for a distance varying with the size and type of bird. The hook is then rotated while, at the same time, it is pulled back gently until the barb on the hook engages the intestine. The hook is then continued to be pulled back until the intestine is partly withdrawn through the vent. The hook is then disengaged and the intestine is then continued to be pulled out by hand until only the upper end is still in the body. A strong steady pull will then serve to tear the upper end of the intestine from its attachment within the body. The lower end of the intestine is then torn from the vent. When this operation is completed, the bird will, to all outer appearance, be still in its natural, unmutilated state. Since there is little or no blood and no unusual opening, no flies or other insects are attracted, and no dirt tends to enter the body. With a little practice, the entire operation may be accomplished in about ten seconds with no resultant unsavory mess.

After use, the entire device may easily and thoroughly be scrubbed down with a brush; the open construction of the frame permits access for cleaning to all parts of the device.

This invention has been described as particularly adapted for field use by hunters. However, it may just as as easily be used in the home or in butcher shops, or the like.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. An intestine remover for game comprising an open housing, at least one hook pivotally connected to one end of said housing, said hook being connected for pivotal movement from an extended position outside said housing to a folded position inside said housing, said hook having an acute angled barb at the free end thereof, and a cover member pivotally connected to said housing, said cover member being adapted to enclose said housing when said hook is in folded position.

2. The device of claim 1 wherein said housing comprises a bottom wall and a pair of side walls connected to said bottom wall, and wherein said cover member comprises a top wall and a pair of side walls connected thereto, each of said side walls of said cover member overlapping the external surface of the corresponding side wall of said housing.

3. The device of claim 2 wherein the bottom edges of the side walls of said cover member are inclined upwardly from the pivotal connection between said cover member and said housing, said bottom edges being at least partially spaced from the bottom of said housing when the cover member is in closed position, whereby a finger hold is provided.

4. An intestine remover for game comprising an elongated housing having an open top and open ends, a cover member pivoted to said housing at one end, and at least one elongated hook member pivotally mounted at the opposite end of the housing between the side walls thereof, said hook being pivotally movable from an extended operative position outside said housing to a folded, inoperative position between the side walls of said housing, said hook having an acute angled barb at the free end thereof.

5. The device of claim 4 wherein there are a plurality of hook members of different lengths, each spaced from the other at their pivot position by spacer washers.

6. The device of claim 4 wherein a slot is provided in the top edge of each side wall of said housing to permit entrance of the fingers to grasp the hook when it is in folded position within the housing.

7. The device of claim 4 wherein said cover member is provided with depending side flanges externally overlapping the side walls of said housing, each of said flanges having an inclined edge which forms an inclined slot externally of the side walls of said housing when said cover member is in closed position on said housing, whereby a finger grip is provided.

8. An intestine remover for game comprising an open housing, at least one hook member pivotally connected to one end of said housing, said hook member being connected for pivotal movement from a folded position completely within said housing to an extended position outside said housing, said housing having a pivot shaft extending across an open end of said housing, said hook member comprising an arm, an eyelet at one end of said arm encompassing said pivot shaft, and a hook barb at the other end of said arm, said barb forming an acute angle with said hook arm, whereby, when said hooked arm is inserted through a game vent, said acute angled hook barb may catch in an angle of the intestine for withdrawing the intestine through said vent.

9. The game intestine remover of claim 8 wherein there are a plurality of hook members of different lengths individually pivoted on said pivot shaft.

References Cited in the file of this patent

UNITED STATES PATENTS

| | | |
|---|---|---|
| 1,421,397 | Bruck | July 4, 1922 |
| 1,788,656 | Brown | Jan. 13, 1931 |
| 2,512,290 | Spang | June 20, 1950 |
| 2,533,445 | Finney | Dec. 12, 1950 |